United States Patent [19]
Miyaji et al.

[11] Patent Number: 5,231,500
[45] Date of Patent: Jul. 27, 1993

[54] DETECTING AND MONITOR DEVICE BY OBSERVING PICTURE IMAGE

[75] Inventors: Kazuo Miyaji; Katsuo Nakadai, both of Tokyo, Japan

[73] Assignee: Fuji Photo Film Co., Ltd., Kanagawa, Japan

[21] Appl. No.: 665,210

[22] Filed: Mar. 6, 1991

[30] Foreign Application Priority Data

Mar. 16, 1990 [JP] Japan .................................. 2-64358
Mar. 16, 1990 [JP] Japan .................................. 2-64359
Oct. 5, 1990 [JP] Japan .................................. 2-266325

[51] Int. Cl.[5] .......................... H04N 7/18; H04N 5/30
[52] U.S. Cl. .............................. 358/209; 358/213.18; 358/909; 358/108; 358/335
[58] Field of Search ............... 358/909, 108, 106, 335, 358/310, 213.18, 967, 22, 209, 906, 29, 29 C, 41

[56] References Cited

U.S. PATENT DOCUMENTS

| | | | |
|---|---|---|---|
| 4,635,123 | 1/1987 | Masunaga et al. | 358/909 |
| 4,805,037 | 2/1989 | Noble et al. | 358/909 |
| 4,860,108 | 8/1989 | Saito et al. | 358/909 |
| 4,918,519 | 4/1990 | Suzuki et al. | 358/909 |
| 4,920,371 | 4/1990 | Kaneko | 358/909 |
| 4,963,985 | 10/1990 | Isoguchi et al. | 358/909 |
| 5,006,871 | 4/1991 | Nobel | 358/909 |

Primary Examiner—James J. Groody
Assistant Examiner—Michael H. Lee
Attorney, Agent, or Firm—Sughrue, Mion, Zinn, Macpeak & Seas

[57] ABSTRACT

A detecting and monitoring device which observes a detected object, includes a video camera with a solid state image pickup device including elements divided into two lines corresponding to an actuating timing of each line, a still video recorder for frame recording a picture image signal in an odd number field and picture image signal in a successive even number field as a picture image signal for one scope, a monitor, an emitting device for emitting a flash, and a strobo synchronizer so as to control the emitting device for emitting the flash in the even number field after an external trigger is input. The still video recorder records the odd field picture image signal and the even field picture image signal including the picture image illuminated under the flash. Thereby, the brightness of the picture image signal in the odd number field and the even number field are substantially equal to prevent flickering from occurring.

23 Claims, 10 Drawing Sheets

DETECTING AND MONITOR DEVICE BY OBSERVING PICTURE IMAGE

BACKGROUND OF THE INVENTION

The present invention relates to a detecting and monitoring device for observing a picture image. According to the invention, the detecting and monitoring device prevents flickering from occurring and prevents emitting a flash from an emitting device without recording normally.

The present invention also relates to a detecting and monitoring device for observing a picture image which is a picture taken by a color video camera under a flash light generated by a stroboscope or other emitting device and played back as a still picture.

In a field of industrial instrumentation and medical industry, a detecting and monitoring device is utilized in a system for photographing a detected object and observing a motion picture and a still picture of the detected object displayed on a monitor. Such a conventional system is shown in FIG. 1.

As shown in FIG. 1, a color video camera or a video camera 01 takes a picture of a detected object 02 and outputs a picture signal V thereof. The picture signal V is transmitted to a monitor 04 through a still picture recording and playback device 03 and displayed as a motion picture. The still picture recording and playback device 03 includes a semi-conductor memory device or a magnetic floppy device. The still picture recording and playback device 03 is capable of recording and playing back a picture signal for one frame (picture signal for one field or one frame) from the picture signal V.

The still picture recording and playback device 03, a stroboscope 06, a variety of sensors 07 and a pushbutton switch 08 are connected to a controller 05, respectively. The sensors 07 detect conditions of the detected object 02 such as a position of the detected object 02. Usually, one of the sensors 07 and the pushbutton switch 08 is selectively operated.

An operation and a function of the system will be described as follows.

For example, when the detected object 02 is moved along a direction of an arrow as shown in FIG. 1, the detected object 02 is displayed as motion picture on the monitor 04. While an operator observes a display on the monitor 04, the operator pushes the pushbutton switch 08 at a moment when a picture scene suitable for a still picture comes into the display. The stroboscope 06 emits a flash under the control of the controller 05, and the picture signal V for one scope including the image picture illuminated with the flash is simultaneously recorded as information in the still picture recording and playback device 03.

During a predetermined interval after the pushbutton switch 08 pushed, for example, 5 seconds, picture images are not transmitted from the color video camera 01 to the monitor 04 and the picture signal for one scope recorded in the still picture recording and playback device 03 is repeatedly reproduced and transmitted to the monitor 04. Thus, the image picture of the detected object 02 taken by the color video camera 01 when the pushbutton switch 08 is pushed is displayed as a still picture on the monitor 04.

After the predetermined interval, the picture image signal output from the color video camera 01 is transmitted to the monitor 04 again and the monitor 04 displays the detected object 02 as a motion picture. Also, the still picture recording and playback device 03 is reset to record other pictures. For example, in a still picture recording and playback device 03 having a magnetic floppy device, a magnetic head is moved to the next track position.

In case that a still picture is observed when the detected object 02 is approached to a detected point, the sensors 07 detect a position of the detected object 02 and output a detecting signal and an operation is started which is similar to the operation started by the pushbutton switch 08.

The above described detecting and monitoring device usually employs a white balance adjusting function. White balance adjustment is an adjustment for adjusting an output signal from the color video camera 01 in accordance with the color temperature of the detected object 02. That is, the picture signal from the color video camera 01 is adjusted so as to clearly reproduce a white object as a white detected object.

FIG. 2 shows a conventional automatic white balance circuit for adjusting the white balance of the picture signal. When the automatic white balance switch (not shown) is operated, sample and hold circuits 09B, 09R as shown in FIG. 2 become in sampling condition and then a feedback group is operated. Each output signal G, R, B from the color video camera 01 is clamped at clamp circuits 010G, 010R, 010B, respectively. Peak white level of each output signals G, R, B is detected by peak wave detector circuits 011G, 011R and 011B, respectively. In comparators 012R and 012B, levels of output signals G and R and levels of output signals G and B are compared, respectively. A RC voltage and BC voltage are fed back to white balance adjusting amplifiers 013R, 013B in accordance with a result of the comparisons of signals, and are set in accordance with gains of the RC voltage and the BC voltage are adjusted to be equal to the levels of signals G, R, B which are output signals from the white balance adjusting amplifiers 013G, 013R and 013B, respectively. After completing white balance adjustment, the white balance switch is turned off and the sample and hold circuits 09B and 09R hold the voltage amount at that time. Hereafter, white balance adjusted signals are obtained based on the RC voltage and the BC voltage held in the sample and hold circuits 09B, 09R.

In a system of frame record by recording odd number field signals and successive even number field signals as picture image signals for one scope, reproducing and transmitting two field signals recorded by frame record to the monitor 04, and displaying the picture image with the two field signals interlaced with the one signal, there is a problem of occurring flicker. The flicker occurs due to a difference of brightness of the odd number field signal and the even number field signal. Even if the difference of the brightness is about 1% thereof, human eyes still feel such a difference as "flicker". In case that one field signal is recorded as the picture image signal for one scope and the picture image signal is reproduced and transmitted recorded one field signal as the signal for one scope to the monitor, the flicker has not occurred in principle.

An occurrence of such a flicker and the degree of the occurrence depend on operation modes and kinds of image pickup elements of the video camera 01, a relation between emitting timing of the stroboscope 06 and photographing timing of the video camera 01 and a recording method (frame recording or other recording method).

In the above described conventional device, the stroboscope 06 generates a flash according to a request from the controller 05 whenever the pushbutton switch 08 is pushed; nevertheless, the still picture recording and playback device 03 is not set in recording condition or the picture image signal V is not set output from the video camera 06. Under the above condition, the picture image can not be recorded. After the still picture recording and playback device 03 is reset correctly, the pushbutton switch 08 is pushed again to emit a flash from the stroboscope 06 and the still picture is recorded in the still picture recording and playback device 03 so as to record the picture image.

Some detected objects dislike being illuminated under flash light several times. In medical industry field, it is desirable to decrease illuminated times for caring a patient who does not want to be inconvenienced. However, in the conventional device, the emitting device emits a flash even if the still picture can not be recorded.

Conventionally, the white balance is adjusted in a mode of taking a motion picture (hereinafter so called as "motion picture mode"). In the motion picture mode, a flash is not generated by the stroboscope 06. On the other hand, the object is illuminated by the stroboscope 06 in a mode of taking a picture for storing picture signal V into the still picture recording and playback device 03 (hereinafter so called as "still picture mode").

Accordingly, color temperature of the object in the moving picture mode is different from that in the still picture mode. If a picture of the object is in the still picture mode and the picture is controlled by the white balance adjustment circuit based on the color temperature in the moving mode, it is a problem that the color of the reproduced picture image is different from the real color of the object.

The purpose of the invention is to provide a detecting and monitoring device by observing picture images in which flicker is prevented from occurring.

Another purpose of the invention is to provide a detecting and monitoring device by observing a picture image in which a flash is not generated unnecessarily.

Another purpose of the invention is to provide a detecting and monitoring device by observing a picture image in which a white balance adjustment is suitably operated according to the changing color temperature of an object.

SUMMARY OF THE INVENTION

To accomplish the above purposes a device according to the invention comprises a video camera or a color video camera having a solid state image pickup device operable in a frame storing mode, a still video recorder for frame recording, a monitor, an emitting device for generating flash, and a strobo synchronizer for controlling the emitting device for generating a flash in an even number field which is after an external trigger is input and controlling the still video recorder for recording odd field picture image signal and even field picture image signal including the picture image illuminated under flash as the information.

If information of the picture image illuminated under flash is inserted into picture image signals of odd number field and even number field evenly and then recorded by the frame record, flicker does not occur while the picture image is reproduced in a monitor.

To accomplish the above purposes, the device according to the invention determines whether a still picture recording and playback device is reset in a recordable condition or not and whether a picture image signal is output from a video camera or not. When the device determines that recording or photographing operation cannot presently be performed, the device prevents unnecessary flashing and recording even if an external trigger is inserted.

Unless a picture image signal including a still picture image is to be recorded, the emitting device does not generate a flash and the still picture image recording and reproducing device is not actuated.

To accomplish the above purposes, the device according to the invention comprises a color video color camera for taking a picture of an object, a still picture image recording and playback device for recording a signal for one scope picked up from an output signal from the color video camera, a monitor for receiving teh output signal from the color video camera or the signal for one scope which has been recorded in the still picture image recording and playback device and then for repeatedly outputting the same to display the picture image, an emitting device for emitting a flash, a strobo synchronizer for controlling the emitting device to emit the flash in response to an input of a external trigger and transmitting a recording signal which commands the recording of the signal for one scope into the still picture image recording and playback device, and an automatic white balance circuit for automatically maintaining an adjusted white balance in response to the color temperature of the object, the device is characterized by comprising a flash color adjusting circuit for adjusting the white balance in response to color temperature of the flash generated from the emitting device, wherein the white balance of the output signal of the color video camera is adjusted by the flash color adjusting circuit and the output signal is supplied to the still picture image recording and playback device in case of the object taken as a picture under flash, and the white balance of the output signal of the color video camera is adjusted by the automatic white balance circuit in case of the object taken as a picture without flash.

According to the invention, when the emitting device emits a flash, white balance of the output signal of the color video camera is adjusted and white balanced by the flash color adjusting circuit, so that proper white balance adjustment is done in response to the color temperature of the object.

On the other hand, white balance of the output signal of the color video camera is adjusted by the automatic white balance circuit when the object is taken as a picture without a flash.

Accordingly, the white balance of the output signal can be suitably adjusted in any case.

BRIEF DESCRIPTION OF THE DRAWINGS

The above and other objects, features and advantages of the invention will become more apparent from reading the following description of the preferred embodiment taken in conjunction with the accompanying drawings, in which.

DETAILED DESCRIPTION OF THE PREFERRED EMBODIMENTS

Figure 7:
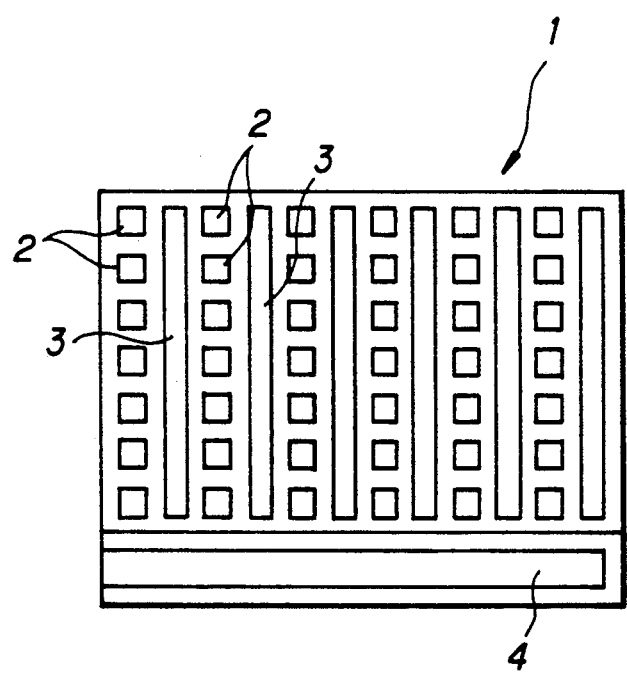
FIG. 7 shows a structure of an interline transmitting charge coupled device (CCD)
Figure 8:
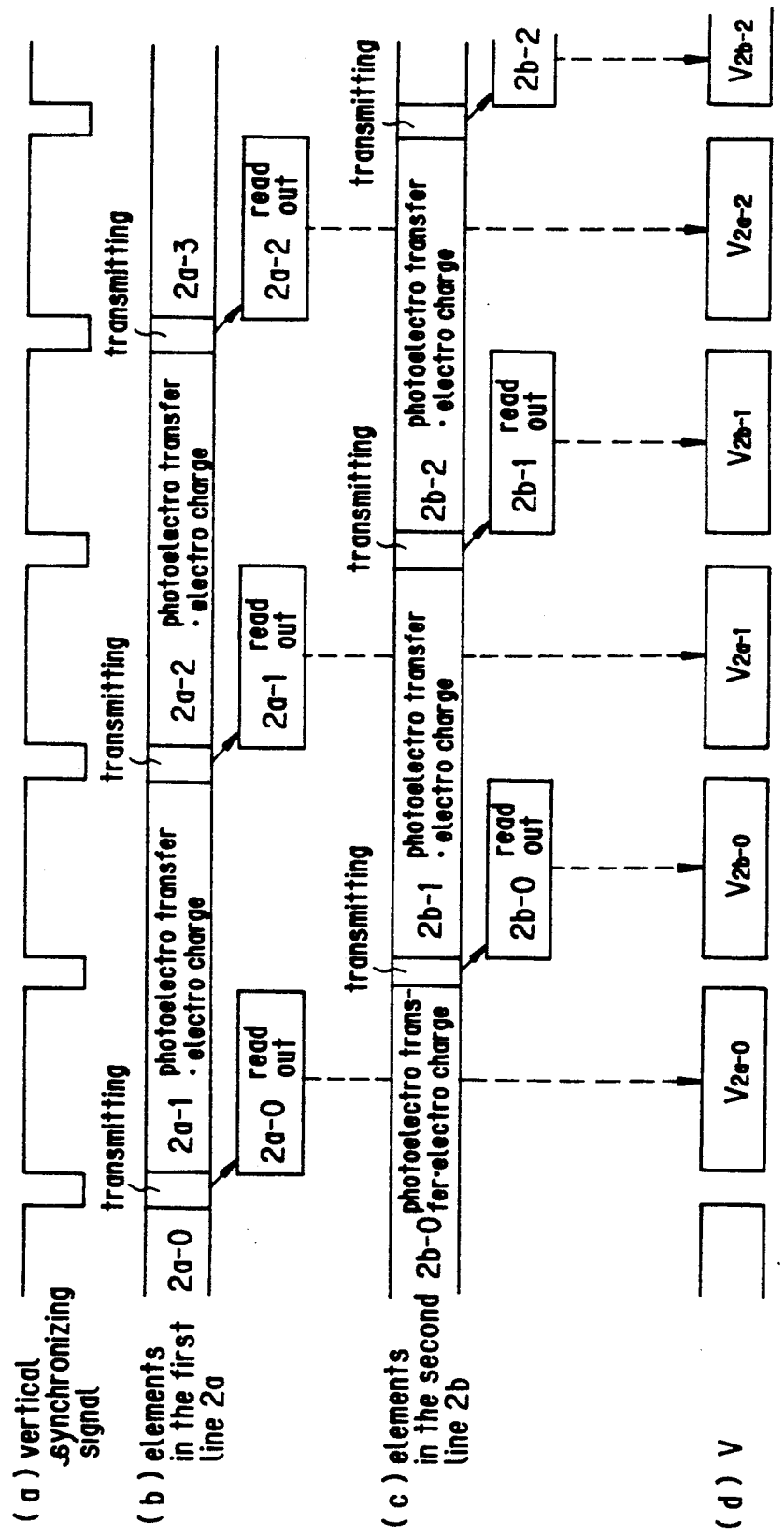
FIG. 8(a)-8(d) show operation of the embodiment according to the present invention when the interline transmitting CCD is actuated in a frame storing mode.

It will be described that a structure of an interline transmitting charge coupled device (CCD) and a storing mode therof adapted to a color video camera with a charge coupled device (CCD) as an image pickup device (hereinafter "CCD camera") of an embodiment according to the invention. FIG. 7 shows an interline transmitting CCD 1 having a light receiving portion 2 for photoelectrically transferring received light, a light shield storing portion 3 and a horizontal scanning portion 4. A signal electrode is photoelectrically transferred at the light receiving portion 2 and transmitted to the storing portion 3 within a vertical retrace interval and the signal electrode is read out through the horizontal scanning portion 4 while signal electrode is charged in the light receiving portion 2 for the next interval.

In the embodiment, the interline transmitting CCD 1 is actuated in the frame storing mode. Several hundred thousand elements of the light receiving portion 2 are divided to two lines $2a$, $2b$, and voltage timing for both lines is different from each other so as to change actuating timing of the lines from each other as shown in FIGS. 8(a)-8(d). That is, elements of the two lines are photoelectrically transferred and electrically charged within two vertical scanning intervals (two fields) and the actuating timing for the elements $2a$, $2b$ of both lines are shifted for one vertical scanning interval (one field). Picture image signal $V_{2a-0}$, $V_{2b-0}$, $V_{2a-1}$, $V_{2b-1}$, $V_{2a-2}$, $V_{2b-2}$ is formed by processing signal electrode $2a-0$, $2b-0$, $2a-1$, $2b-1$, $2a-2$, $2b-2$ read out from the elements of both lines $2a$, $2b$, respectively.

Figure 3:
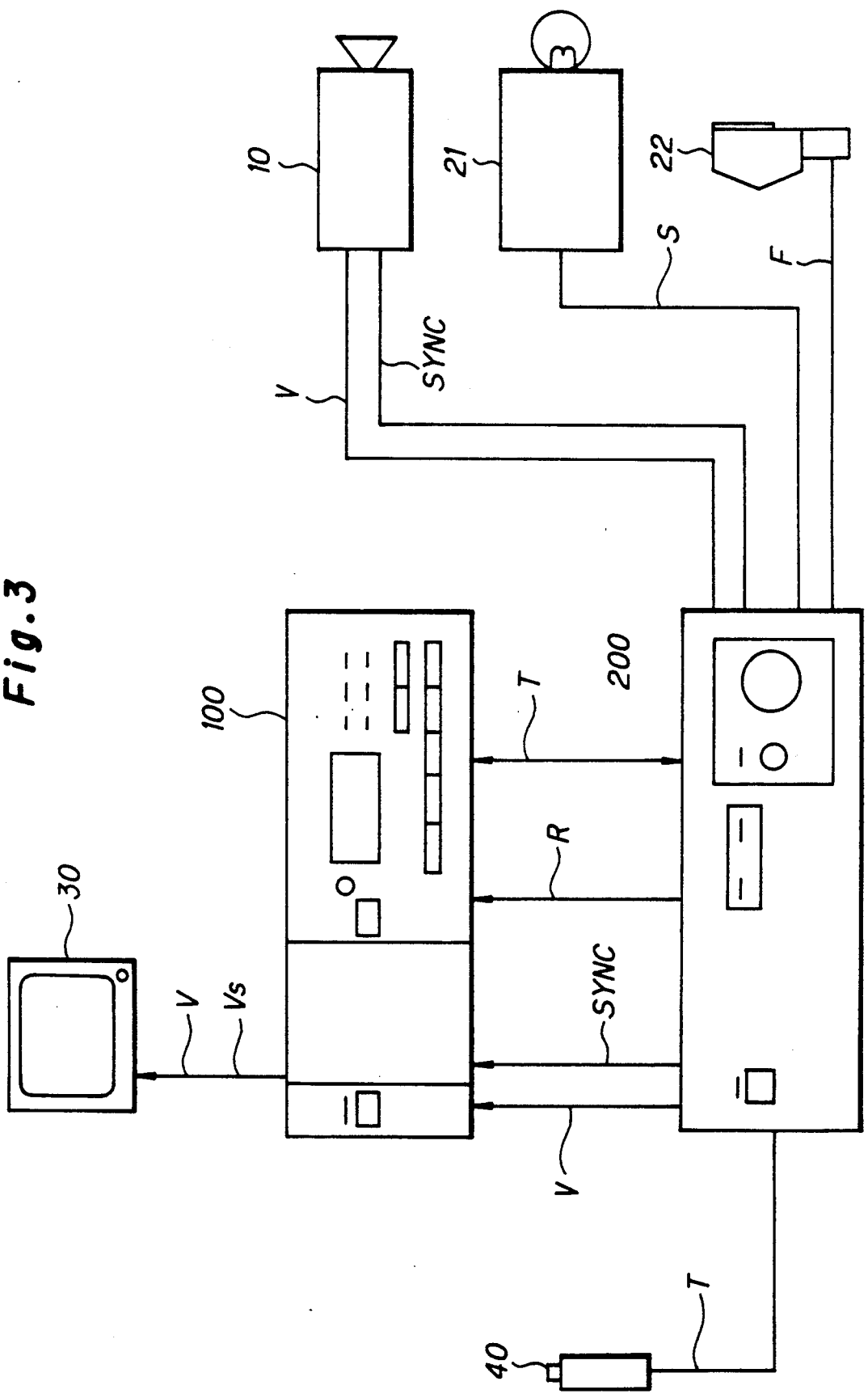
FIG. 3 shows a structure of an embodiment according to the present invention.

FIG. 3 shows a detecting and monitoring device of an embodiment according to the present invention. The detecting and monitor device of the embodiment as shown in FIG. 3 comprises a CCD camera 10, a strobo device 21 or a flash device 22, a monitor 30, a pushbutton switch 40, a still video recorder (still picture image recording and playback device) 100 and a strobo synchronizer 200.

The CCD camera 10 includes the above described interline transmitting CCD actuated in frame storing mode. The CCD camera 10 takes a photograph of a detected object and continuously outputs an image signal V (including color signals R, G, B and synchronizing signal SYNC). The image signal V is transmitted to the still video recorder 100 and further to the monitor 30 through the strobo synchronizer 200.

The strobo device 21 or the flash device 22 is employed as a light emitting device and illuminates the detected object by emitting a flash of light. The strobo device 21 irradiates a flash when strobo driving signal S at TTL (transistor logic; binary signal of 0V and 5 V) level is input into the strobo device 21. The flash device 22 irradiates the flash when the flash driving signal (X contact point signal) F is input into the flash device 22.

The still video recorder 100 utilizes a floppy disk as recording medium. The still video recorder has a frame recording function which picks up odd numbered field picture image signals and successive even numbered field picture image signals as a picture image signal for one scope, and records the picture image signal for one scope in one track of the floppy disk.

Figure 4:
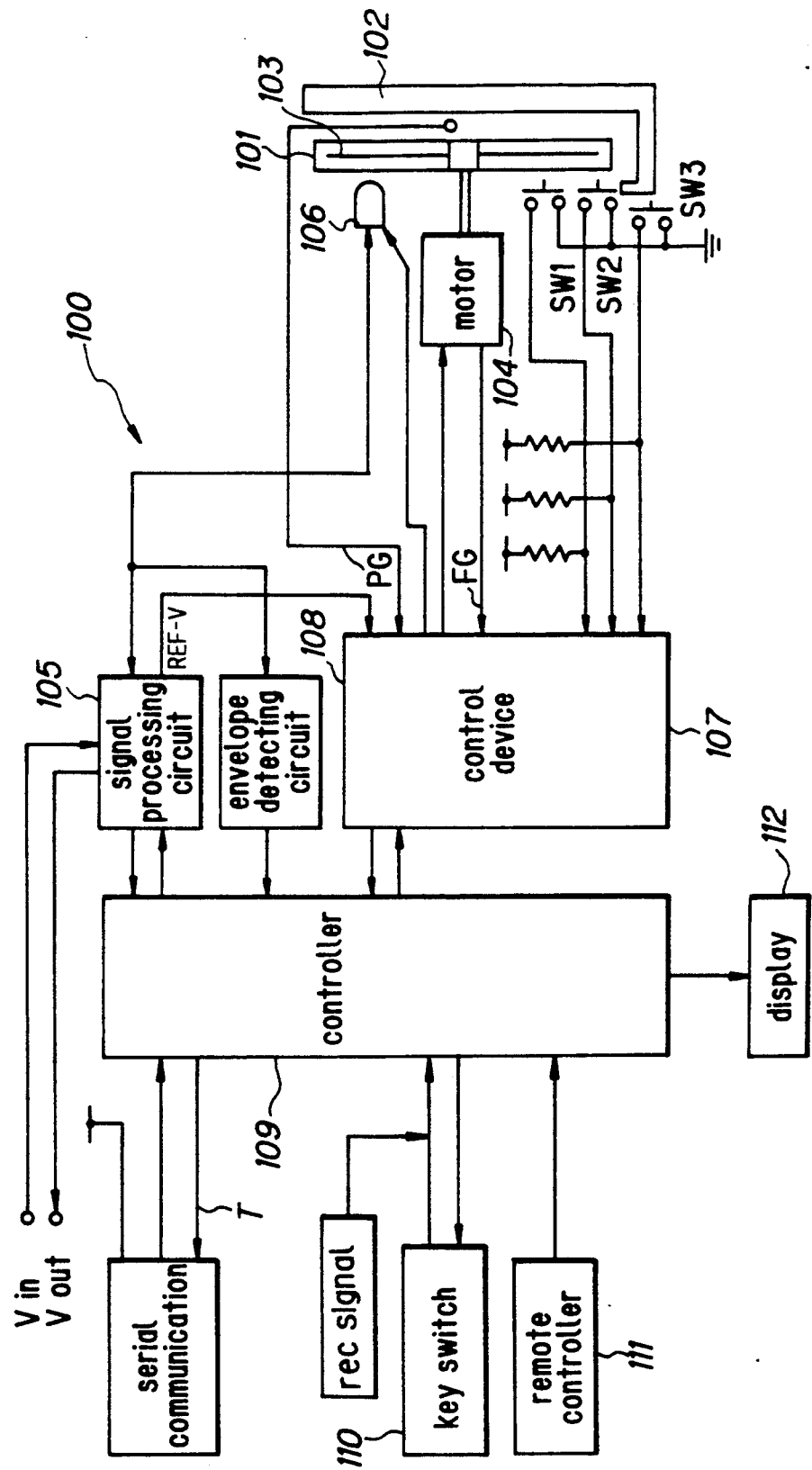
FIG. 4 is a block diagram showing an inside structure of a still picture image recorder.

The still video recorder 100 has a structure as shown in a block diagram in FIG. 4. The disk pack 101 is inserted into a bucket 102 and then the bucket 102 is closed. The floppy disk 103 in the disk pack 101 is attached to a spindle of a motor 104. When the picture image signal V is transmitted to be recorded through the strobo synchronizer 200, the picture image signal V is modulated (by FM modulation and so on) at a signal processing circuit 105 and recorded in the floppy disk 103 by a magnetic head 106. When such picture image signal is reproduced, the picture image signal is obtained from the floppy disk by the magnetic head 106 and transmitted, the transmitted signal is demodulated (by FM demodulation and so on) at the signal processing circuit 105 and becomes the picture image V and then the picture image V is transmitted to the monitor 30. In moving picture mode as described as follows, the picture image signal V is immediately transmitted to the monitor 30 through the signal processing circuit 105. A control device 107 controls rotational speed and rotational phase of the motor 104 based on a reference vertical synchronizing signal REF-V, a phase detecting pulse PG and a frequency pulse FG picked up from the picture image signal V. A position of the magnetic head 106 is controlled. Detecting signals are transmitted from detecting switches SW1, SW2, SW3 to the control device 107. The detecting switch SW1 detects whether a pawl for preventing error memory deletion is set in a position for prohibiting memory delete or not, and transmits an alarm signal when the pawl is set in the position for prohibiting memory delete. The detecting switch SW2 detects whether the disk pack 101 is stored in the bucket 102 or not and transmits an alarm signal when the disk pack 101 is not stored in teh bucket 102. The detecting switch SW3 detects whether the floppy disk 103 is attached to the spindle of the motor 104 and transmits an alarm signal when the floppy disk 103 is not attached at the spindle of the motor 104.

An envelop detecting circuit 108 detects an envelop of the modulated picture image signal picked up from the floppy disk 103 by the magnetic head 106 so that the envelop detecting circuit 108 detects an unrecorded track and a central point of a recorded track on the floppy disk 103 (in playback mode and delete mode).

A controller 109 is provided for generally controlling operations of the still video recorder 100. The controller 109 detects a detecting condition of each detecting switch SW1, SW2 and SW3 and outputs command signals to actuate predetermined operations in response to operation commands transmitted from a key switch 110 and a remote controller 111 mounted on a front panel (not shown). The controller 109 further self-diagnoses whether the still video recorder 100 is set in a recording position or not. The controller 109 diagnoses whetehr the still video recorder 100 is set in a recording position by itself in a method of detecting whether the detecting switches SW1, SW2, SW3 output an alarm signal or not, the picture image signal is input or not, and an unrecorded track is remained or not. The results of self-diagnosis is transmitted to the strobo synchronizer 200 as communication mode T by serial communication.

Figure 5:
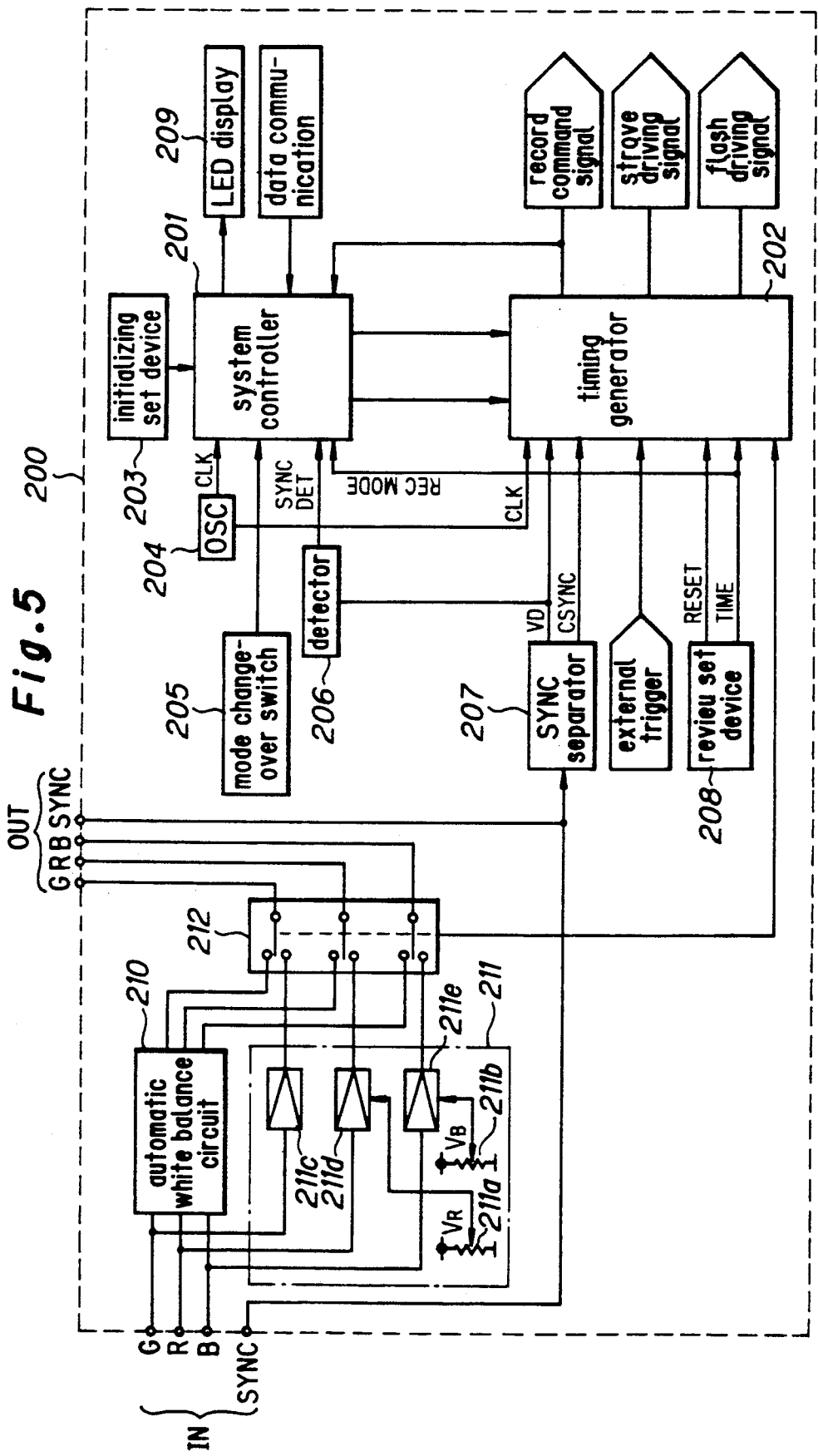
FIG. 5 is a block diagram showing an inside structure of a strobo synchronizer.

As shown in FIG. 5, the strobo synchronizer 200 comprises a system controller 201, a timing generator 202, an initialization device 203, an oscillator 204, a mode switching device 205, a synchronizing signal detecting device 206, a synchronizing signal separator 207, a review setting device 208, a LED display device 209, an automatic white balance circuit 210, a strobo color adjusting circuit 211 and a changeover switch 212.

Figure 1:
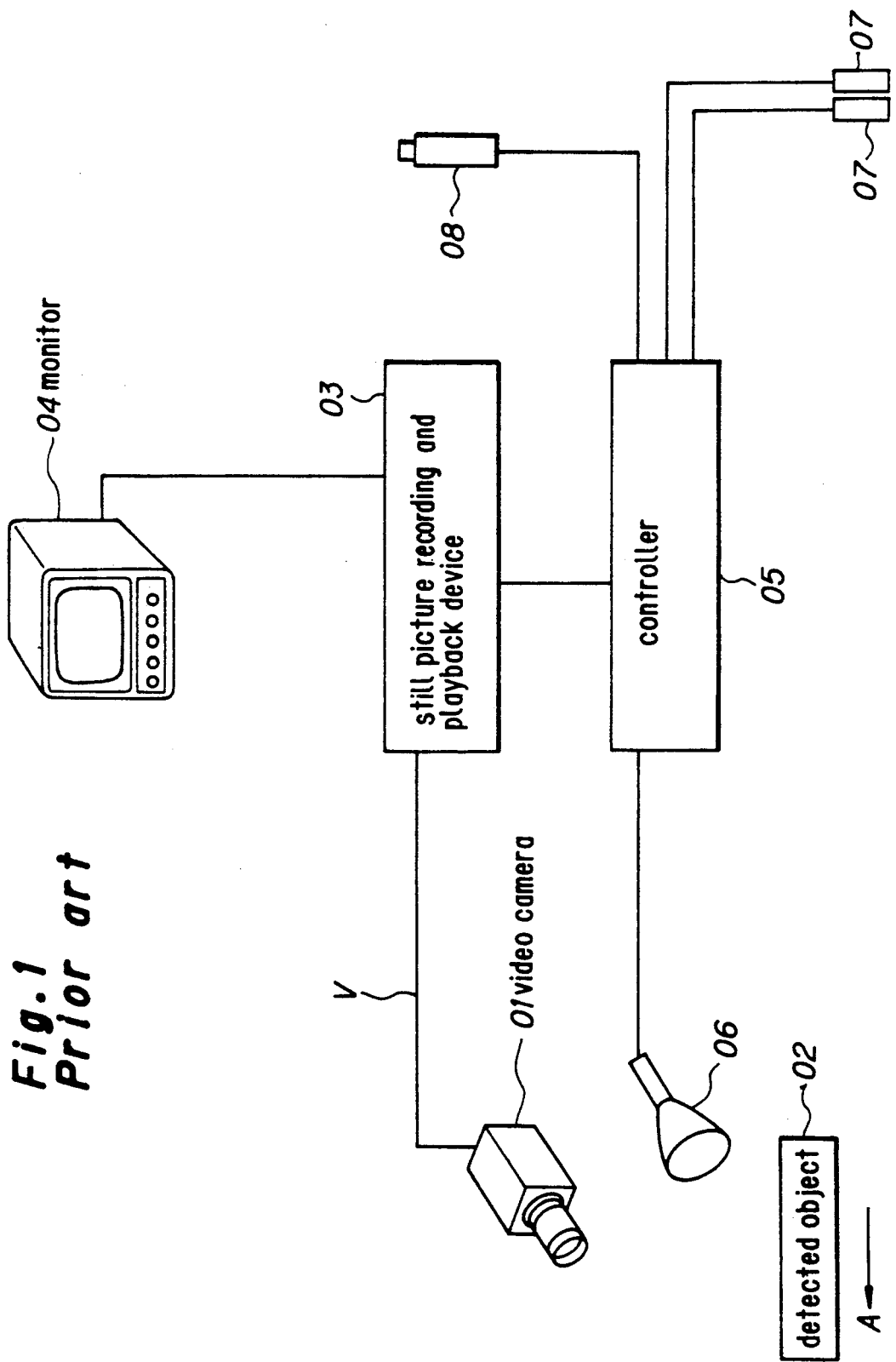
FIG. 1 shows a structure of a conventional device.
Figure 2:
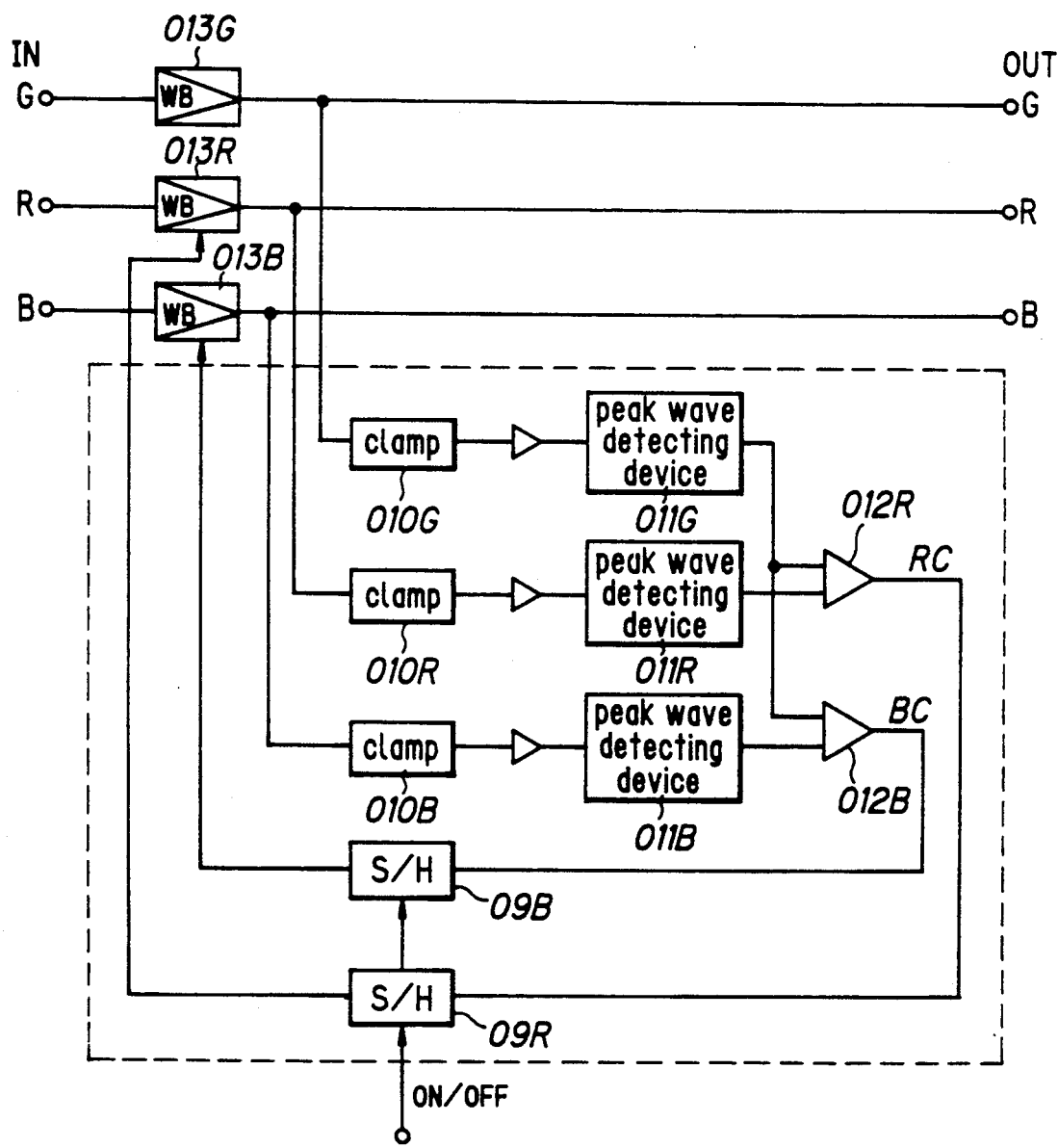
FIG. 2 shows an automatic white balance circuit according to the conventional device.

The automatic white balance circuit 210 has the same structure of a conventional automatic white balance circuit as shown in FIG. 2.

The strobo color adjusting circuit 211 comprises resistors 211a, 211b, in which strobo color adjustment voltage $V_R$, $V_B$ corresponding to the color temperature of a flash generated from the strobo device 21 or the flash device 22 is designed, respectively, an amplifier 211c for amplifying signal G which is a reference of color signal level when the white balance is adjusted, and amplifiers 211d, 211e for amplifying signals R, B for which the gain is determined by the strobo color adjusting voltage $V_R$, $V_B$, respectively. Thus, the strobo color adjusting circuit 211 transmits color signals G, R, B of which white balance is adjusted based on the color temperature of the flash generated by the strobo device 21 or the flash device 22.

The change-over switch 212 selects output signal of the automatic white balance circuit 210 in the moving picture mode, and changes a contact point in accordance with a color adjusting changing-over signal transmitted from the timing generator 202 so as to select the signals output from the strobo color adjustment circuit 211.

Operation of the detecting and monitoring device of the embodiment as described before will be described as follow.

At first, the strobo synchronizer 200 detects whether the still video recorder 100 is set in the recording position or not. That is, the communication data T is transmitted from the strobo synchronizer 200 to the still video recorder 100 for detecting the position thereof. The still video recorder 100 diagnoses whether the still video recorder 100 can record by itself. The strobo synchronizer 200 confirms the condition of the still video recorder 100 by receiving the communication data T from the still video recorder 100 to detect the condition when the still video recorder 100 is set in a recording position. It is also detected whether a cable (not shown) for receiving the communication data T is connected and an electro battery of the still video recorder 100 is powered on by the detecting voltage of a specific terminal. The strobo synchronizer 200 further detects whether the communication data T from the still video recorder 100 is returned within a predetermined interval after transmitting the communication data T from the strobo synchronizer 200. Unless the response is received within the predetermined interval, it is determined to be communication error. After detecting a condition of the still video recorder 100 and recognizing the still video recorder 100 set in a recording position, the still recorder 100 becomes in a panel lock condition in which the still video recorder 100 is controlled by only a command from the strobo synchronizer 200. When a mode change-over switch 205 of the strobo synchronizer 200 is turned on, a panel lock command is output. When the mode change-over switch 205 is turned off, the still video recorder 100 is released from the panel lock condition. When the still video recorder 100 is in the panel lock condition, even if the key switch 110 and the remote controller 111 mounted on the still video recorder 100 are operated, any action in response to operation of the key switch 110 and the remote controller 111 is not actuated. The floppy disk 103 can be detached even if the still video recorder 100 is et in the panel lock condition. When the detecting switch SW2 detects that the floppy disk is detached, the communication data T indicates that the still video recorder 100 cannot record is transmitted from the still video recorder 100 to the strobo synchronizer 200.

The strobo synchronizer 200 detects whether the picture image signal V is output from the CCD camera 10 and the strobo device 21 or the flash device 22 is set in an emitting position. Presence of the picture image signal V is determined by the synchronizing signal detecting device 206 detecting the picture image signal V. Emitting position of the strobo device 21 or the flash device 22 is determined by detecting the charge voltage.

Upon checking the above described items and determining the recording condition improper, the LED display device 209 displays information indicating the same, and emitting of a flash from the strobo device 21 or the flash 22 and recording of the still video recorder are prohibited. Accordingly, the strobo device 21 or the flash device 22 does not emit a flash and the still video recorder 100 does not record even though the pushbutton switch 40 is pushed. Upon checking the still video recorder 100, the CCD camera 10, the strobo device 21 or the flash device 22 and confirming a position thereof, their positions are changed to the moving picture mode and the still picture mode as described below.

The moving picture mode is a condition when the pushbutton switch 40 is not pushed. In the moving picture mode, the picture image signal V output from the CCD camera 10 is transmitted through strobo synchronizer 200 to the still video recorder 100 and further to the monitor 30. Then, a detected object (not shown) photographed by the CCD camera 10 is displayed on the monitor as the moving picture image.

In that time, the change-over switch 212 of the strobo synchronizer 200 selects the output signals of the automatic white balance circuit 210. In the moving picture mode, the white balance adjustment is operated based on the color temperature of the object in the automatic white balance circuit 210.

The synchronize signal separator 207 (see FIG. 5) of the strobo synchronizer 200 picks up a vertical synchronize signal VD (see FIG. 6B) from the synchronizing signal SYNC and outputs the synchronizing signal SYNC (composed synchronizing signal CSYNC) with the vertical synchronizing signal VD and transmits them to the timing generator 202. The timing generator 202 forms field detecting signal FDET (see FIG. 6C) based on the vertical synchronizing signal VD and the composed synchronizing signal CSYNC. The field detecting signal FDET becomes high in odd number field and low in even number field.

Figure 6:
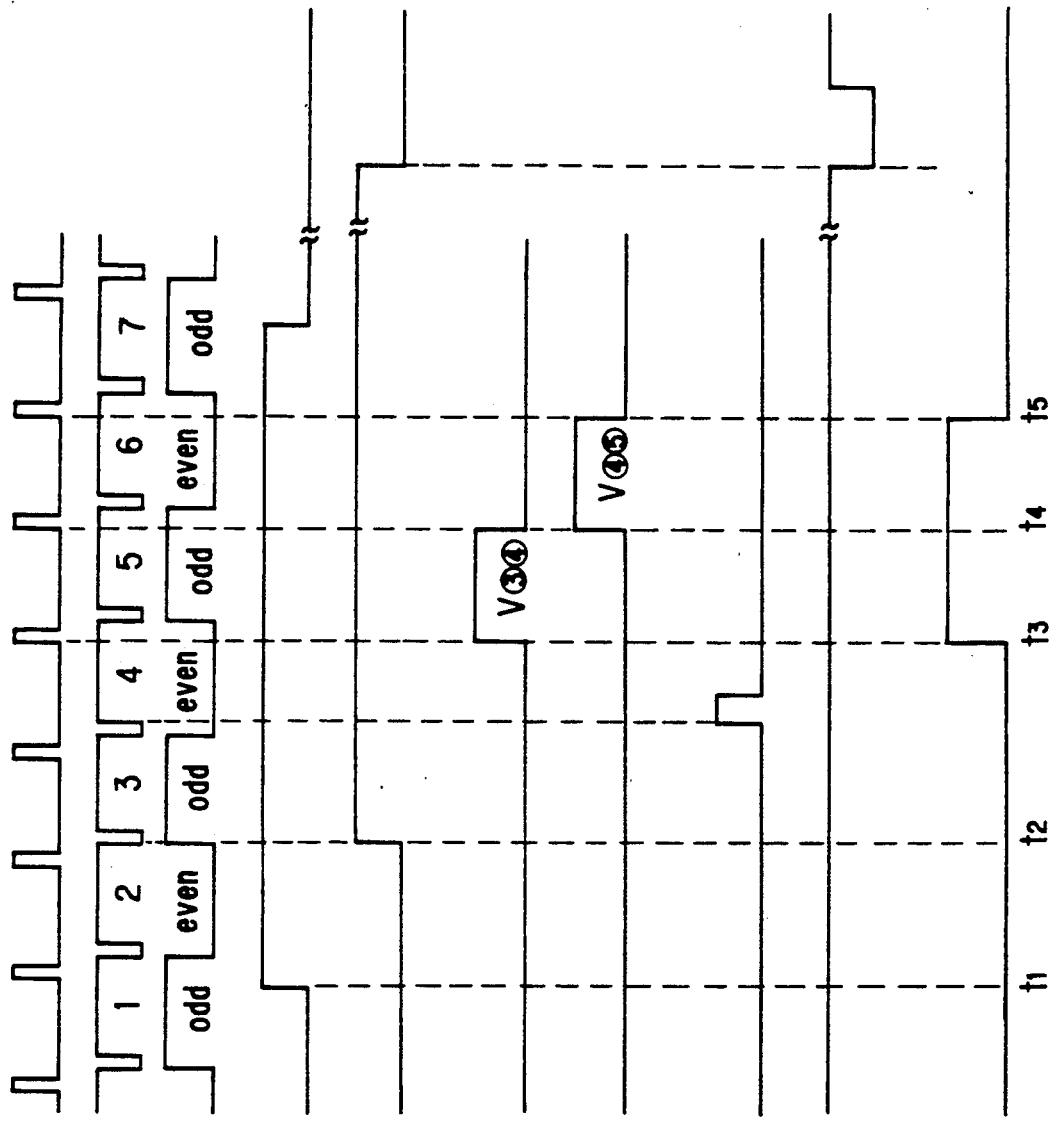
FIGS. 6A-6I are timing diagrams showing operation timings of an embodiment according to the present invention.

The moving picture mode as described above turns to the still picture mode by the occurrence of the external trigger T pushed by the pushbutton switch 40. The external trigger T is input to the timing generator 202 of the strobo synchronizer 200. After that time, a variety of actions are operated at corresponding timings as shown in FIG. 6.

In FIGS. 6A–6I, numeral (1) is a field when the external trigger is input and numerals (2), (3), (4), ... are later successive fields, respectively.

When the external trigger TR is input at time t1 within the field 1, the timing generator 202 transmits a record command signal R to the still video recorder 100 at time t2 (immediately before field (3)) when the field detecting signal FDET changes from low level to high level and outputs the strobo driving signal S (in case of the strobo device 21 used) at time immediately before the field (4) delayed one field from the time t2. It is preferable that driving signals S, F output in the field (4) at the time immediately after the vertical retrace line between the fields (3) and (4). If flash timing is too early and occurs in a vertical retrace interval, photoelectric transfer and electric charge cannot be performed so that the flash emission is wasted. It is preferable to complete the flash emission in the field (4) to avoid that the flash timing is too late and occurs in the next vertical retrace interval.

On the other hand, the still video recorder 100 records the picture image signal in an odd number field and the picture image signal in a successive even number field in order as one pair of signals in the frame recording. The record command signal R is input at time t2, the picture image signal in the first odd number field and the picture image signal in the first even number field after the time t2 are frame recorded as a pair of picture image signals V34, V45. Electric current for recording flows in each magnetic head in the odd number field and even number field depending on timing of Ts and t4. The timing depends on PG (see FIG. 6A) which occurs before the seven horizontal synchronizing intervals of the vertical synchronizing signal VD (see FIG. 6B) by every one rotation of the floppy disk. When the record command signal R is input to the still video recorder 100 at time t2, picture image signal V34 in the odd number field and picture image signal V45 in the even number field are recorded into the floppy disk 103 at the time t3 and the time t4, respectively.

When the above described picture image signals V34 and V45 are recorded, that is, in a period from the time t3 to t5, the timing generator 202 of the strobo synchronizer 200 turns on color adjustment change-over signal I (FIG. 6I). In a period of the color adjustment change-over signal ON, the change-over switch 212 selects the output signal of the strobo color adjustment circuit 211. Accordingly, white balance of the picture image signal recorded in the still video recorder 100 is adjusted based on the corresponding color temperature of a flash emitted from the strobo device 21 or the flash device 22.

As described before, the interline transmitting CCD provided at the CCD camera 10 is actuated in the frame storing mode. The picture image signal V34 in the odd number field is formed based on a read-out electrode signal which is photoelectrically transferred and stored. The picture image signal V45 in the even number field is formed based on read-out electrode signal which is photoelectrically transferred and stored. Since the flash occurs in the field (4), the electrode signal formed in the field (4) is extremely large compared with the electrode signal formed in the fields (3) and (5). Both of the picture image signals V34, V45 include much larger electrode signals formed in the field (4) and the relatively less electrode signals formed in the field (3) and the field (5). In the result, the brightness level of the picture image signal V34 and the brightness of the picture image signal V45 are almost equal.

After the picture image signals V34 and V45 are recorded in the floppy disk, the still video recorder 100 repeatedly reproduces the recorded picture image signal V34 from the field (7) and transmits it to the monitor 30. Simultaneously, the picture image signal V output from the CCD camera 10 is not transmitted to the monitor 30. On a screen of the monitor 30, a picture image of the detected object which is taking a picture at a moment of the pushbutton switch 40 is pushed is displayed as a still picture image of which white balance is adjusted corresponding to the color temperature of the flash emitted from the strobo device 21 or the flash device 22.

Since the brightness level of the produced picture image signals V34 and V45 are almost equal, the still picture image is displayed without flicker.

A period for reproducing the recorded picture image is set in the review set device 208. The record command signal R maintains a high level during the set period. The still video recorder 100 plays back during the set period. After the determined period has passed and the record command signal R becomes a low level, the still video recorder 100 stops the playback of the picture image signals V34, V45. The picture image signals from the CCD camera 10 is transmitted to the monitor 30. However, if the review reset signal REVWOF (see FIG. 6H) goes from a high level to a low level, the record command signal R is reset and stops the playback and the still picture image mode is changed to the moving picture mode although the record command signal R is reproducing.

While the monitor 30 displays the moving picture, if it become impossible to record the picture image due to some accident, for example, the floppy disk pulled from the still video recorder or the battery of the recorder turned OFF, communication data T indicating the impossibility of the recording operation is transmitted from the still video recorder 100 to the system controller 201 of the strobo synchronizer 200. When the picture image signal V is not output from the CCD camera 10, the synchronizing detecting signal SYNC DET is stopped and does not transmit from the synchronizing detecting device 206 to the system controller 201. If the system controller 201 detects a condition in which recording is impossible, the system controller 201 stops operating the timing generator 202 and stops outputting the driving signals S and F. While the system controller 201 holds the above stop condition, the record command signal R and the driving signals S and F are not output and flash is not emitted, the still video recorder 100 is not reset in the recording position and the moving picture mode is maintained, even if the pushbutton switch 40 is pushed so that it is prevented from emitting flash while the still video recorder 100 can not record. Some detected objects dislike being illuminated under flash light at several times, particularly, in medical industry, redundant emission makes a patient uncomfortable. The above improvement to prevent from emitting redundantly is important.

In FIG. 5, the oscillator 204 oscillates reference clock CLK and the initializing set device 203 sets a communication mode depending on the kind of the still video recorders.

In the above described embodiment, the picture image signal V is output from the CCD camera 10. If it is utilized in a video camera in a type of outputting RGB signal, the RGB signal is transmitting directly to the still video recorder 100 and further to the monitor 30 through the strobo synchronizer 200 and the synchronizing signal is transmitted to the still video recorder 100 through the strobo synchronizer 200.

Figure 9:
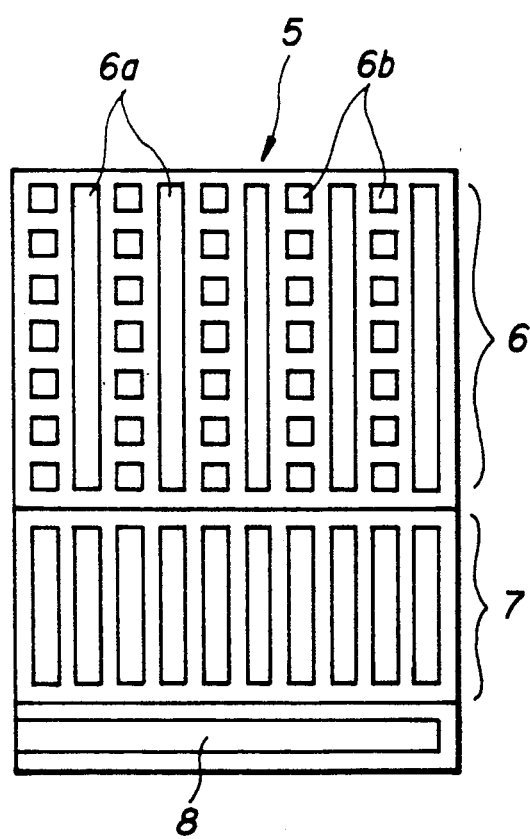
FIG. 9 shows a structure of another interline transmitting charge coupled device.

It may be utilized in a video camera having a frame interline transmitting CCD operated in a frame storing mode as well as a video camera having an interline transmitting CCD. As shown in FIG. 9, the frame interline transmitting CCD 5 comprises a light receiving portion 6 having light diodes 6a and vertical CCDs 6b, a storing portion 7 and a horizontal scanning portion 8. The frame interline transmitting CCD is capable of attaching to the video camera with a solid state image pickup device including number of elements divided to two line corresponding to actuating timing thereof, elements in each line photoelectrically transfer and electrically store within two vertical scanning interval and the actuating timings of the elements in each line are shifted by one vertical scanning interval from each other.

Figure 10:
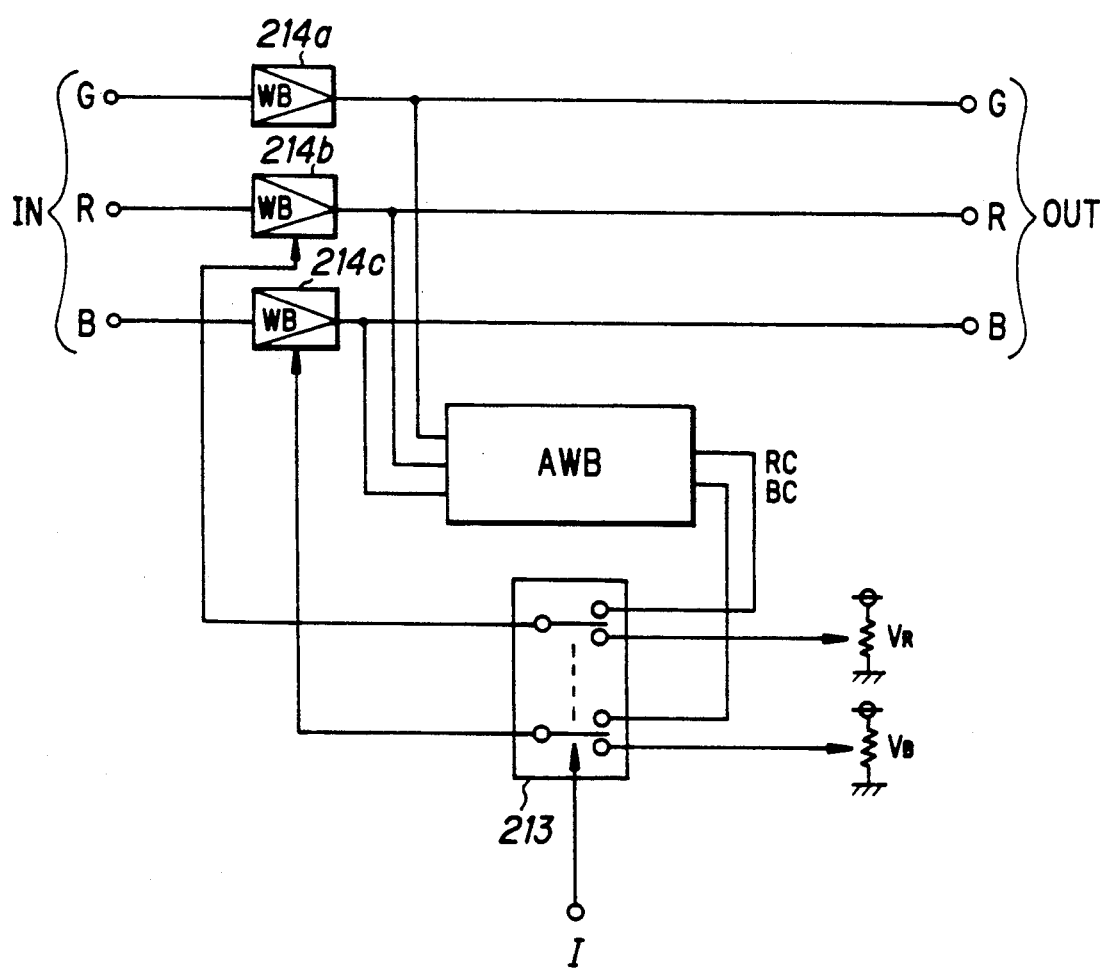
FIG. 10 shows a white balance circuit of another embodiment according to the present invention.

FIG. 10 shows a white balance circuit according to another embodiment according to the present invention. In the circuit as shown in FIG. 10, either RC voltage and BC voltage in the automatic white balance AWB circuit as shown in FIG. 2 or strobo color adjusting voltages VR and VB in the strobo color adjusting circuit 211 as shown in FIG. 5 are selected by a changeover switch 213 and gain of the white balance adjusting amplifiers 214b and 214c is adjusted. The change-over switch 213 is changed by color adjustment change-over signal I as similar as the change-over switch 211 described in the first embodiment according to the present invention. Thus, the device according to the second embodiment can be operated as similar as the first embodiment.

According to the second embodiment, there is an advantage of the amplifiers 214a to 214c in the white balance circuit in the moving picture mode and the still picture mode used in common for the both modes.

According to the above described embodiments according to the present invention, an object illuminated under flash is photographed by a video camera with a solid state image pickup device operated in the frame storing mode. Frame recording picture image signal outputs from the video camera to the still video recorder. The device displays the recorded frame picture video signal repeatedly reproduced on a screen of a monitor. Picture image displayed on the monitor is very clear without occurring flicker, since the timing of flash emission and the timing of taking a photograph are set most suitable.

According to the above described embodiments according to the present invention, a flash is not emitted when the still picture image cannot be recorded so that redundant flash can be prevented.

According to the above described embodiments according to the present invention, the white balance of the signal is adjusted corresponding to the color temperature of the flash when the still picture image is recorded under flash, so that the natural and clear reproduced picture image can be provided.

We claim:

1. A detecting and monitoring apparatus comprising:

a video camera having an interline type solid state image pickup device, said interline type solid state image pickup device being driven in a frame storage mode, and a detecting and monitoring device for observing a picture image, said detecting and monitoring device comprising:

a still video recorder for recording a picture image video signal from said video camera using a frame recording method, said still video recorder recording a picture image in first and second fields as a pair of picture image signals, a monitor for displaying said picture image recorded in said still video recorder, an emitting device for emitting a flash, and a strobe synchronizer for receiving an external trigger and for controlling said emitting device and said still video recorder, said strobe synchronizer comprising:

a logic circuit for identifying a starting point of said first field of a picture image after said external trigger is input, said picture image in said first field being subsequently recorded in said still video recorder, a record control signal output circuit for outputting a record control signal at a beginning of a field preceding said first field and succeeding a field during which said external trigger occurred, and an emitting control output means for outputting an emitting control signal for said emitting device at a beginning of a field preceding said first field and succeeding said field during which said external trigger occurred.

2. A detecting and monitoring device for observing a picture image, comprising:

a video camera for photographing an object to produce a picture image signal, a still picture image recording and playback device for recording a picture image signal for one frame picked up from the picture image signal from said video camera, said still picture image recording and playback device recording a first picture image in a first field and a second picture image in a second field as a pair of picture image signals, a monitor for displaying a picture image recorded in said still picture image recording and playback device, an emitting device for emitting a flash, and a strobe synchronizer for transmitting an emission control signal to command said emitting device to emit said flash in response to an exterior trigger and for transmitting a record control signal to command said still picture image recording and playback device to record said picture image signal for one frame, said strobe synchronizer comprising:

a logic circuit for determining said first field of a picture image after said external trigger is input, said first field being subsequently recorded in said still picture image recording and playback device, a record control signal output circuit for outputting a record control signal simultaneously with a timing frame of said picture image in said first field determined by said logic circuit and with said picture image signal in said successive second field, and an emitting control output means for outputting said emission control signal for said emitting device during a period of a field which is immediately before said first field, said record control signal being output during a field which is immediately before said field in which said emission control signal is output, wherein, while a picture image is not being recorded, said strobe synchronizer detects whether said still picture image recording and playback device is able to record a next picture image and whether said picture image signal from said video camera is being output, said strobe synchronizer preventing said emission control signal and said record control signal from being output, even if said external trigger is input, when said picture image recording and playback device is unable to record or photograph due to a system error.

3. A detecting and monitoring device as claimed in claim 2, wherein when said strobo synchronizer detects whether said still picture image recording and playback device is set in a recording condition, said picture image signal from said video camera is output and said emitting device is set in an emitting condition, and wherein when said strobo synchronizer determines that it is impossible to record, photograph or emit suitably, said strobo synchronizer alarms impossibility of recording and said emission control signal and said record control signal are not output, even if said external trigger is input.

4. A detecting and monitoring device for observing a picture image, comprising:

a color video camera for photographing an object to produce a picture image signal, a still picture image recording and playback device for recording an output signal output for one frame picked up from the picture image signal from said color video camera, said still picture image recording and playback device records a picture image in a first field and a picture image in a second field as a pair of picture image signals, a monitor for displaying a picture image by receiving said output signal from said color video camera or said output signal for one frame repeatedly reproduced and output after being recorded in said still picture image recording and playback device, an emitting device for emitting a flash, and a strobo synchronizer for transmitting an emission control signal to command said emitting device to emit said flash after inputting an exterior trigger and for transmitting a record control signal to command said still picture image recording and playback device for recording said picture image signal for one frame to said still picture image record and playback device, said strobo synchronizer comprising:

a logic circuit for determining said first field of a picture image after said external trigger is input, said first field being substantially recorded in said still picture image recording and playback device, a record control signal output circuit for outputting a record control signal simultaneously with a timing of frame recording of said picture image in said first field determined by said logic circuit and with said picture image signal in said successive second field, an emitting control output means for outputting said emission control signal for said emitting device within a period of a field which is immediately before said first field, an automatic white balance circuit for automatically adjusting white balance of said output signal so as to maintain adjusted white balance corresponding to a color temperature of said object, and a flash color adjusting means for adjusting white balance corresponding to a color temperature of said flash emitted from said emitting device, wherein white balance of said output signal of said color video camera is adjusted by said flash color adjusting means and supplied to said still picture image recording and playback device when said object is photographed under said flash, and white balance is adjusted by said automatic white balance circuit when said object is photographed without said flash.

5. A detecting and monitoring device as claimed in claim 1, wherein said emitting control signal is output immediately after a vertical retrace line between said first and second fields.

6. A detecting and monitoring device as claimed in claim 2, wherein said emitting control signal is output immediately after a vertical retrace line between said first and second fields.

7. A detecting and monitoring apparatus as claimed in claim 2, wherein said video camera has an interline type solid state image pickup device, said interline type solid state image pickup device being driven in a frame storage mode.

8. A detecting and monitoring apparatus as claimed in claim 4, wherein said video camera has an interline type solid state image pickup device, said interline type solid state image pickup device being driven in a frame storage mode.

9. A detecting and monitoring apparatus according to claim 1, wherein said field during which said record control signal was outputted precedes a field during which said emitting control signal is outputted.

10. A detecting and monitoring apparatus according to claim 1, wherein said record control signal is output at a beginning of a field preceding said first field and succeeding a field during which said external trigger occurred.

11. A detecting and monitoring apparatus according to claim 2, wherein said field during which said record control signal was outputted precedes a field during which said emitting control signal is outputted.

12. A detecting and monitoring apparatus according to claim 2, wherein said record control signal is output at a beginning of a field preceding said first field and succeeding a field during which said external trigger occurred.

13. A detecting and monitoring apparatus according to claim 4, wherein said record control signal is output at a beginning of a field preceding said first field and succeeding a field during which said external trigger occurred.

14. A detecting and monitoring apparatus according to claim 4, wherein said field during which said record command signal was outputted precedes a field during which said emitting control signal is outputted.

15. A detecting and monitoring apparatus according to claim 1, wherein said still video recorder generates a field detecting signal that identifies a starting point of each field and said strobe synchronizer further comprises a timing generator for transmitting said record control signal when said field detecting signal changes from a first state to a second state thereby identifying the beginning of a third field, said timing generator outputting said emitting control signal when said field detecting signal changes from said second state to a first state, thereby identifying the beginning of a fourth field.

16. A detecting and monitoring apparatus according to claim 2, wherein said still video recorder generates a field detecting signal that identifies a starting point of each field and said strobe synchronizer comprises a timing generator for transmitting said record control signal when said field detecting signal changes from a first state to a second state thereby identifying the beginning of a third field, said timing generator outputting said emitting control signal when said field detecting signal changes from said second state to a first state, thereby identifying the beginning of a fourth field.

17. A detecting and monitoring apparatus according to claim 4, wherein said still video recorder generates a field detecting signal that identifies a starting point of each field and said strobe synchronizer comprises a timing generator for transmitting said record control signal when said field detecting signal changes from a first state to a second state thereby identifying the beginning of a third field, said timing generator outputting said emitting control signal when said field detecting signal changes from said second state to a first state, thereby identifying the beginning of a fourth field.

18. A detecting and monitoring apparatus according to claim 1, wherein said emitting control signal is output in a field at a time immediately after a vertical retrace line of said image signal, said emitting control signal ending before an end of said field in which said emitting control signal is initiated, to avoid flash emission during a next vertical retrace interval.

19. A detecting and monitoring apparatus according to claim 2, wherein said emitting control signal is output in a field at a time immediately after a vertical retrace line of said image signal, said emitting control signal ending before an end of said field in which said emitting control signal is initiated, to avoid flash emission during a next vertical retrace interval.

20. A detecting and monitoring apparatus according to claim 4, wherein said emitting control signal is output in a field at a time immediately after a vertical retrace line of said image signal, said emitting control signal ending before an end of said field in which said emitting control signal is initiated, to avoid flash emission during a next vertical retrace interval.

21. A detecting and monitoring apparatus according to claim 1, wherein said emitting control signal is output between adjacent vertical retrace lines in the picture image, such that the emitting control signal is not output during a vertical retrace interval.

22. A detecting and monitoring apparatus according to claim 2, wherein said emitting control signal is output between adjacent vertical retrace lines in the picture image, such that the emitting control signal is not output during a vertical retrace interval.

23. A detecting and monitoring apparatus according to claim 4, wherein said emitting control signal is output between adjacent vertical retrace lines in the picture image, such that the emitting control signal is not output during a vertical retrace interval.

* * * * *